(12) United States Patent  (10) Patent No.: US 9,108,857 B2
Pigeon et al.  (45) Date of Patent: Aug. 18, 2015

(54) PROCESS FOR AMMONIA SATURATION OF SOLID MATERIALS, AND CORRESPONDING ASSEMBLY

(71) Applicant: Faurecia Systemes D'Echappement, Nanterre (FR)

(72) Inventors: Alice Pigeon, Chagey (FR); Regis Panozzo, Vieux Charmont (FR)

(73) Assignee: Faurecia Systemes D'Echappement, Nanterre (FR)

( * ) Notice: Subject to any disclaimer, the term of this patent is extended or adjusted under 35 U.S.C. 154(b) by 0 days.

(21) Appl. No.: 14/035,004

(22) Filed: Sep. 24, 2013

(65) Prior Publication Data

US 2014/0093444 A1    Apr. 3, 2014

(30) Foreign Application Priority Data

Oct. 1, 2012    (FR) ...................................... 12 59280

(51) Int. Cl.
*C01C 1/00*      (2006.01)
*F17C 3/00*      (2006.01)

(52) U.S. Cl.
CPC .. *C01C 1/006* (2013.01); *F17C 3/00* (2013.01)

(58) Field of Classification Search
CPC ............ C01C 1/003; C01C 1/006; F17C 3/00
See application file for complete search history.

(56) References Cited

U.S. PATENT DOCUMENTS

2010/0266475 A1    10/2010    Johansen

FOREIGN PATENT DOCUMENTS

| WO | 2006130113 A1 | 12/2006 |
| WO | 2010025947 A1 | 3/2010  |
| WO | 2012056131 A1 | 5/2012  |

OTHER PUBLICATIONS

Search Report from corresponding FR Application, FR 12 59280, filed Oct. 1, 2012.

*Primary Examiner* — Christopher P Jones
(74) *Attorney, Agent, or Firm* — Carlson, Gaskey & Olds, PC

(57) ABSTRACT

A process for ammonia saturation of a solid material capable of absorbing and desorbing ammonia, the solid material being composed of solid particles and includes placing the solid material in contact with a cooled surface, with the solid material being disposed against the cooled surface in a thin layer having a thickness of less than 100 mm. The process further includes injecting a stream of gaseous ammonia to be in contact with the solid material, while the solid material is in contact with the cooled surface.

6 Claims, 1 Drawing Sheet

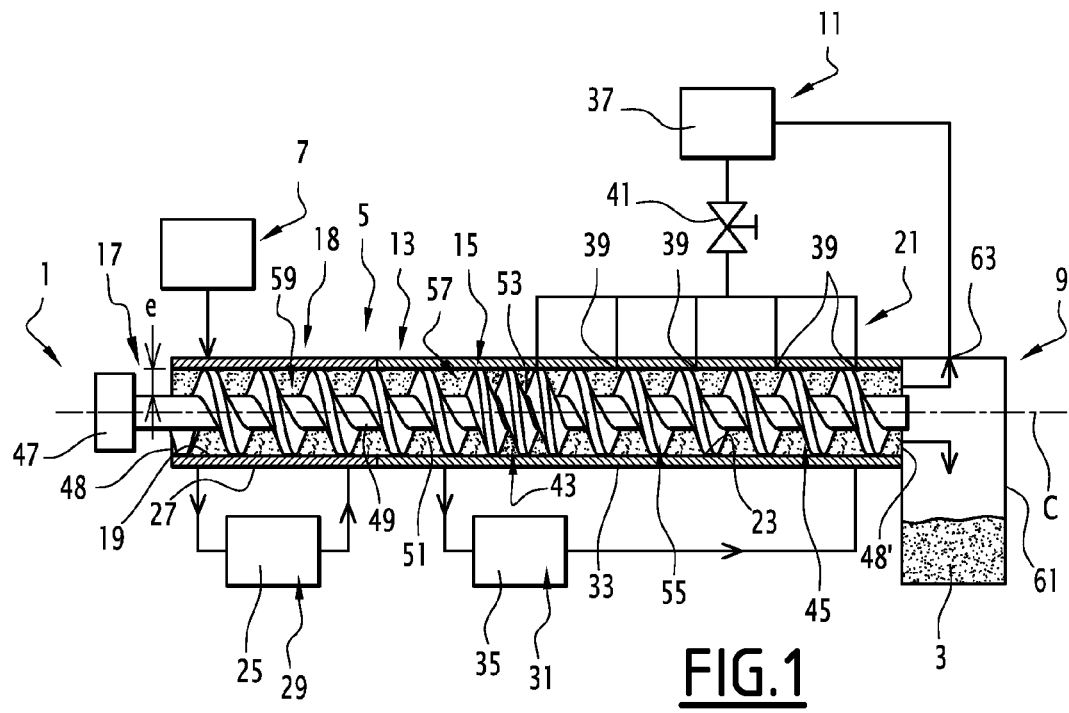
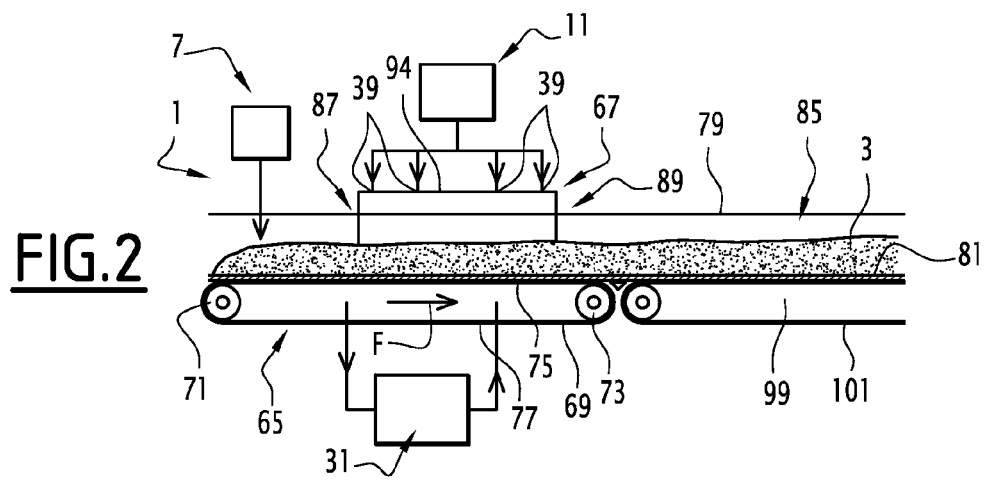
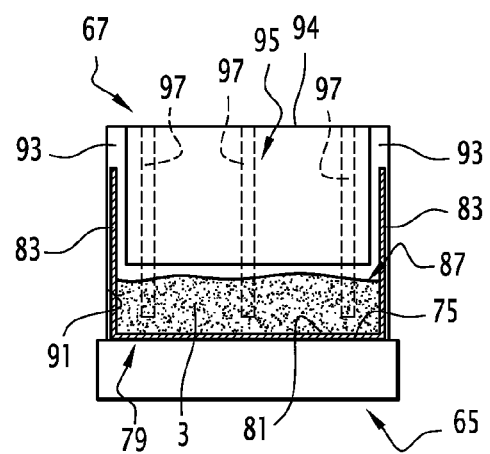

PROCESS FOR AMMONIA SATURATION OF SOLID MATERIALS, AND CORRESPONDING ASSEMBLY

RELATED APPLICATION

This application claims priority to FR 12 59280, filed Oct. 1, 2012.

TECHNICAL FIELD

The invention relates generally to processes for ammonia saturation of solid materials such as metal salts.

More specifically, according to a first aspect, the invention relates to a process for ammonia saturation of a solid material capable of absorbing and desorbing ammonia, the material being composed of solid particles.

BACKGROUND

The document WO 2010/118 853 discloses a method wherein a solid material is placed in a liquid ammonia bath, the bath being stirred and maintained under gas pressure of between 4 and 10 bar. The ammonia absorption by the solid material is an exothermic reaction. Furthermore, it is known that increasing the temperature of the storage material contributes to limiting the reaction of ammonia absorption by the storage material. In order to limit or prevent the rise in temperature, the bath is supplied with an excess of liquid ammonia which evaporates under the effect of heat released from the absorption reaction. The gaseous ammonia is removed and recycled. According to a variant, the excess of liquid ammonia is replaced by another known refrigerant.

Such a method is effective, however its implementation requires technically complex equipment. Moreover its production capacity is limited.

Within this context, the invention is aimed at providing a method of saturation, the implementation of which requires simpler equipment and which makes it possible to continuously produce and thus to achieve higher production capacities.

SUMMARY

A process for ammonia saturation of a material capable of absorbing and desorbing ammonia, the solid material being composed of solid particles, comprises the following steps:
- placing of the solid material in contact with a cooled surface, the material being disposed against the cooled surface in a thin layer having a thickness of less than 100 mm;
- injecting a stream of gaseous ammonia to be in contact with the solid material, while the solid material is in contact with the cooled surface.

Placing a layer of the solid material of limited thickness against the cooled surface makes it possible to ensure the effective cooling of the entire solid material. The cold spreads without any difficulty throughout the layer on account of its thinness. Thus, all of the material is maintained at an adequate temperature that is appropriate for the absorption of gaseous ammonia. Due to this factor, it is not necessary to cool the solid material by evaporation of a quantity of liquid ammonia.

This enables the process to be considerably simplified. Indeed, the excess gaseous ammonia resulting from the evaporation reaction must be captured and recompressed or cooled in order to be transformed into liquid ammonia and recycled. This is not necessary in the process of the invention.

Moreover, the liquid ammonia bath in document WO 2010/118853 should be under significant gaseous ammonia pressure, which requires equipment designed to withstand pressure and the means for controlling the gas pressure inside the equipment. This is unnecessary in the method according to the invention. It is therefore conceivable that the method according to the invention may indeed be implemented inside equipment that is simpler and less expensive.

Moreover, in the method in document WO 2010/118853, it is necessary after saturation to provide for a specific step during which the gaseous ammonia pressure is broken and the residual ammonia is separated from the solid material. In the invention, it is not necessary to provide for a specific step such as this, the small amount of gaseous ammonia remaining after saturation escapes easily when the saturated solid material is off loaded from the process. This enables the speeding up of the process and helps in achieving higher production capacities.

The solid material may be in a wide variety of forms. It may be in the form of tablets, blocks, balls, pellets, gravel, granules, powder, etc. These elements may have all kinds of shapes and sizes.

The ammonia storage material is, for example, a material of the type described in patent application WO 2008/077 652. The material is, for example, selected from the group known as metal amine complex, and having the general formula $M_a(NH_3)_nX_z$ wherein M is one or more cations selected from the group of alkali metals such as Li, La, K or Cs, alkaline earth metals such as Mg, Ca or Sr, and/or transmission materials such as V, Cr, Mn, Fe, Co, Ni, Cu, Zn, or combinations of these metals such as NaAl, KAl, $K_2Zn$, CsCu or $K_2Fe$, with X being one or more anions selected from the group consisting of fluorides, chlorides, bromides, iodides, nitrates, thiocyanates, sulfates, molybdates, phosphate ions, a being the number of cations per molecule of salt, z being the number of anions per molecule of salt, n being a coordination number between 2 and 12. For example, the ammonia storage material is $MgCl_2$ or $SrCl_2$ or $CaCl_2$, or a mixture of these elements.

Absorption is understood herein to refer to all of the phenomena known under the name adsorption, or complexation. The reactions of ammonia absorption by the storage material occur at moderate temperatures, these temperatures being specific for each solid storage material. These reactions are reversible, with ammonia being desorbed from the solid material at high temperature.

The term cooled surface is understood herein to refer to a surface which is maintained at an adequate temperature that is appropriate for the reaction of ammonia absorption by the solid material. The surface is maintained within a temperature range generally by a positive action, typically by a cooling device. This cooling device cools the surface typically by circulation of a fluid such as water or air, or any other suitable fluid.

The surface is maintained at a temperature typically falling between −33° C. and 40° C.; for example between −15° C. and 30° C., and preferably between −10° C. and 10° C.

The layer formed by the solid material has a thickness less than 100 mm, preferably less than 50 mm, and more preferably less than 10 mm. The size of the solid particles is selected to enable good distribution of the solid material over such a thickness.

The gaseous ammonia is injected in a manner to be able to spread throughout the layer of solid materials. The stream of ammonia is typically injected through the cooled surface. According to a variant, the stream of gaseous ammonia sweeps across the layer of solid materials along a side that is opposite the cooled surface, and diffuses into the layer through this side.

The solid material is held against the cooled surface, with injection of gaseous ammonia, for a period of time that is sufficient to bring about an almost total saturation of the solid material with ammonia. Typically, saturation is considered completed when the solid material contains a quantity of ammonia that is between 90% and 100% of the theoretical maximum amount that it is capable of absorbing. The maximum quantity is thus a function of the mass of solid materials and the number of ammonia atoms that is likely to be absorbed by each molecule of the solid material. In the case of SrCl2, eight ammonia molecules can be absorbed by each SrCl2 molecule.

In practice, saturation is reached after a few minutes, for example after 5 min., of sweeping over by a gaseous ammonia stream, and generally between 1 and 2 min.

The saturation process may also have one or more of the following characteristic features, considered individually or according to any technically possible combination.

According to a first embodiment of the invention, the solid material moves along the cooled surface. In other words, the cooled surface is fixed, and the solid material is driven in a manner to move along, or relative to, the cooled surface. The non-saturated solid material is deposited at a first end of the cooled surface. The length of the cooled surface and the speed of movement are chosen in order for the solid material to be saturated with ammonia upon its reaching the opposite end of the cooled surface.

Such an operation is well suited to a continuous saturation process, and contributes to ensuring that a high production capacity is obtained.

The solid material is driven relative to the cooled surface by a variety of different kinds of devices: a screw, moving scraper elements/members, or any other type of apparatus capable of moving a material made up of solid particles. The term screw in the present invention includes both a single screw, as well as a twin screw comprising two screws parallel to one another, or any assembly comprising a plurality of screws parallel to one another. The screw or screws are engaged in a chamber defining the cooled surface. In the case of assemblies comprising two or more screws parallel to one another, these screws are driven about their respective axes of rotation following the same direction of rotation. This enables the obtaining of a good mixing of the solid material, the latter flowing in a manner circumferential to the periphery of the screws, around the cooled surface, in addition to the movement parallel to the axis or axes of the screw or screws. The processing time period is increased.

Alternatively, according to a second embodiment of the invention, the solid material moves with the cooled surface. In other words, the cooled surface is movable. It moves from a point at which the non-saturated solid material is loaded onto the cooled surface, up to another point where the saturated solid material is off loaded from the cooled surface. As before, the distance between the point of loading and the off loading point, and the speed of movement of the solid material, are planned to allow for the complete saturation of the solid material with ammonia. As previously mentioned, such a mode of operation is well suited for a continuous process, and helps to increase the production capacity.

The movable cooled surface is, for example, a conveyor belt of a belt conveyor or corresponds to a plurality of cooled movable buckets, or any other type of movable surface.

According to another aspect of the invention, the solid material moves inside a chamber in which gaseous ammonia is injected, with the solid material moving in a continuous fashion relative to the chamber. Thus, the process is a continuous process. This is understood to mean that the unsaturated solid material is deposited continually at an inlet of the chamber, and that the saturated solid material is removed continually from an outlet of the chamber. Such a process makes it possible to obtain far greater production capacities than in batch (discontinuous) treatment processes, in which the solid material is processed in batches (a process referred to as batch process).

According to another aspect of the invention, the process may also include a step of drying of the solid material by heating and a step of cooling of the solid material, preceding in this order the injection of a stream of gaseous ammonia to be in contact with the solid material.

Hence, integrated within the same process are operations which, in the prior art are performed in an entirely separate manner. The production process may thus be simplified.

In this case, the solid material is moved in a continuous fashion from the step of heating to the step of cooling, and then to the step of injection of a stream of gaseous ammonia to be in contact with the solid material. The integration of these different steps in a continuous process helps to increase the production capacity.

According to another aspect of the invention, the gaseous ammonia is injected at a pressure of between 1 and 3 bar absolute.

In other words, the process is carried out with limited gaseous ammonia pressure. It is not necessary for the equipment in which the process is implemented to be comprised of equipment that can withstand high gas pressure. The equipment and apparatus are thus simpler and more economical. Moreover, it is not necessary to provide for a step of decompression in the process, to follow after the step of ammonia saturation, to bring the solid material back to a pressure close to atmospheric pressure. The solid material can be extracted directly from the equipment in which the ammonia saturation has been carried out, without prior decompression. This helps to speed up the process and simplify the equipment used for implementing the process. In addition, the ammonia can be easily recycled in the process, since the pressure is substantially constant throughout the process.

According to a second aspect, the invention relates to an assembly for ammonia saturation of a solid material capable of absorbing and desorbing ammonia, the solid material being composed of solid particles, the assembly comprising:
 a cooled surface;
 a device to place the solid material in contact with the cooled surface, the solid material being disposed against the cooled surface in a layer having a thickness of less than 100 mm; and
 an injection device to inject a stream of gaseous ammonia to be in contact with the solid material while the solid material is in contact with the cooled surface.

In one example, the assembly includes a stifling device to stir the solid material in contact with the cooled surface.

The assembly preferably further comprises a device for collecting the saturated solid material, and a device for the capture and disposal of the residual gaseous ammonia remaining after the end of the saturation operation.

This assembly is designed to implement the process that has been described here above.

The solid material is of the type described above.

According to one aspect of the invention, the saturation assembly comprises a heating device to heat solid material, a device to supply the heating device with the solid material, and a drive device that moves the solid material from the heating device to the cooled surface.

As indicated here above, the drying of the solid material and the saturation of the solid material can be carried out in the same assembly, which helps to increase the production capacity.

According to a first embodiment of the invention, the assembly includes a chamber defining on an inside, a tubular volume having a central axis and having first and second axial sections. The second axial section of the tubular volume defines the cooled surface. The chamber further includes an axial screw that ensures the transfer of the solid material axially all the way from upstream to downstream along the second axial section.

The screw is preferably a single screw, or a twin screw with parallel axes.

The screw extends along the central axis of the tubular volume. It typically has a generally cylindrical shape.

The screw has a helical thread winding about the central axis, the windings of the screw defining therebetween a helical groove. a free edge of the thread extends to the immediate proximity of a an inner surface of the tubular volume such that, when the screw is driven to rotate relative to this surface, the solid material is driven axially along the inner surface.

The groove has a depth corresponding substantially to the thickness desired for the layer of solid material. Thus, the screw serves to keep against the cooled surface a layer of solid material of suitable thickness.

By way of a variant, the solid material could be driven through the tubular volume by the scraper blades, or any other suitable device.

According to one aspect of the invention, the tubular volume comprises the first axial section having a heated surface, the second axial section comprising a first axial zone towards the first axial section and a second axial zone away from the first axial section, the injection device being able to inject the ammonia into the second axial zone and not into the first axial zone.

Thus, the device for heating of the solid material corresponds to the first axial section of the chamber, and the second axial section defines the cooled surface.

Such a chamber is particularly convenient to use, since it enables the integration in a single unit of equipment of both the heating device and the cooling device. It is very compact.

The heated surface of the first axial section is heated by any suitable heating device. The surface is heated, for example, by circulation of a heat transfer fluid in a jacket, for example water, or a gas or any other type of suitable fluid. According to a variant, the heated surface is electrically heated.

The axial screw ensures the transfer of the solid material axially, initially along the first axial section and then along the second axial section. Thus, in leaving the first axial section, wherein the drying is carried out, the solid material undergoes initially a cooling in the first axial zone, prior to the ammonia saturation process starting in the second axial zone. This allows for the lowering of the temperature of the solid material to a temperature suitable for the saturation reaction.

In all cases, the screw is arranged to form a plug of solid material upstream of the second axial section in order to limit ammonia losses.

This plug is capable of restricting the passage of ammonia injected into the second axial section from flowing upstream, for example, to the first axial zone and towards the first axial section where the heating is carried out. This plug of solid material corresponds to a quantity of solid material sufficiently compressed in a manner to limit the passage of the gaseous ammonia. Such a compression is achieved by locally shortening the thread pitch of the screw. This plug exists even when the chamber does not include the first heating section, and has only a cooling section.

According to a second embodiment of the invention, the saturation assembly includes a chamber defining on the inside a tunnel into which the gaseous ammonia is injected, and a conveyor having a movable surface for transporting of the solid material through the tunnel, the movable surface constituting the cooled surface.

As previously indicated above, the movable surface may be a conveyor belt of a belt conveyor, or the buckets of a bucket conveyor, etc.

According to one aspect of the second embodiment, the assembly preferably includes a device to stir the solid material and which is disposed within the chamber.

This device serves to facilitate the absorption of the ammonia by the solid material.

The stirring device comprises, for example, a rake provided with teeth immersed in the solid material, a vibrating device, shapes formed on the conveyor belt, etc. As in the first embodiment, the assembly may include a device for heating the solid material placed in the tunnel, or placed upstream of the tunnel relatively to the direction of movement of the solid material.

According to a variant, whether it be for the first or second embodiment of the invention, the heating device cannot be integrated into the chamber where saturation of the solid material is carried out. The solid material, after heating, is transferred in a continuous manner to the chamber where the saturation is carried out. Alternatively, the heating is carried out by batch, based on a discontinuous batch process, or continuously on another equipment. The dry solid material, after heating, is transferred to a buffer storage. The dry solid material is then fed continuously from the buffer storage to the chamber where saturation is achieved.

BRIEF DESCRIPTION OF THE DRAWINGS

Other characteristic features and advantages of the invention will become apparent from the detailed description given below, without limitation and purely by way of indication, with reference made to the accompanying drawings in which:

FIG. 1 is a simplified schematic representation of an assembly for ammonia saturation of a solid material according to a first embodiment of the invention, comprising a heating device and cooling device;

FIG. 2 is a simplified schematic representation of an assembly for ammonia saturation of a solid material according to a second embodiment of the invention; and FIG. 3 is a schematic elevation view of the assembly in FIG. 2.

DETAILED DESCRIPTION

The assembly 1 represented in FIG. 1 is designed for use in the ammonia saturation of a solid material 3 capable of absorbing and desorbing ammonia. The solid material 3 is presented in the form of solid particles of small sizes, for example, having a maximum outer diameter of less than 1 mm. The assembly 1 comprises:
- an extruder 5;
- a device 7 for feeding the extruder 5 with solid material that is either not ammonia saturated or weakly saturated with ammonia;
- a device 9 for collecting the solid material saturated with ammonia exiting from the extruder 5; and a device 11 for injection of a stream of gaseous ammonia into the extruder 5.

The extruder 5 comprises a chamber 13 defining on the inside a cylindrical tubular internal volume 15, and a rotating screw 17. The tubular internal volume 15 has a central axis C. The screw 17 extends along the central axis C.

The chamber 13 comprises a first axial section 18 defined by a heated surface 19 and a second axial section 21 defined by a cooled surface 23.

Furthermore, the assembly 1 includes a heating device 25 for heating the heated surface 19. The heating device 25 typically includes a jacket 27 formed in the first axial section 18 of the chamber 13, and a circulator 29 for circulating a first heat transfer fluid in the jacket 27. The fluid circulating in the jacket 27 is in thermal contact with the heated surface 19.

The assembly 1 also comprises a cooling device 31 for cooling the cooled surface 23. The cooling device 31 comprises a jacket 33 housed in the second axial section 21 of the chamber 13, and a circulator 35 for circulating a second heat transfer fluid in the jacket 33. The heat transfer fluid circulating in the jacket 33 is in thermal contact with the cooled surface 23.

The device 11 for injection of a stream of gaseous ammonia comprises a reservoir 37 for gaseous ammonia, a plurality of injection points 39 opening into the internal volume 15 of the chamber 13, a dosing member 41, and an assembly of piping connecting an outlet of the reservoir 37 to the dosing member 41 and connecting the dosing member 41 to the injection points 39. The dosing member 41 is, for example, an assembly of proportional valves, each valve being located immediately upstream of an injection point 39. Each valve is thus dedicated to an injection point 39. According to a variant, the dosing member 41 is a single proportional valve, serving all the injection points 39. According to a variant, the dosing member 41 is a dosing pump. The reservoir 37 is, for example, a tank. The injection points 39 are distributed over the cooled surface 23.

More precisely, the second axial section 21 includes a first axial zone 43 located towards the first axial section 18 and a second axial zone 45 away from the first axial section 18. The first axial zone 43 adjoins the first axial section 18. Altogether, the first axial section 18 and the first 43 and second 45 axial zones, cover the entirety of the axial length of the chamber 13. The injection points 39 are distributed only over the second axial zone 45. The injection points 39 are distributed in a substantially uniform manner, circumferentially about the axis C, and axially along the second axial zone 45. The injection points 39 terminate in orifices located at the level of the cooled surface 23.

There are no injection points opening into the first axial zone 43.

The internal volume 15 extends axially from an upstream end 48 up to a downstream end 48'. The upstream 48 and downstream 48' ends are open. The first axial section 18 opens out to the exterior of the chamber 13 through the upstream end 48 and the second axial section 21 through the downstream end 48'.

The screw 17 is engaged in the internal volume 15 and extends axially across the length thereof. The assembly 1 further comprises a motor 47 coupled with the screw 17, and selectively driving this screw 17 to rotate about the axis C.

The screw 17 in the example shown is a single screw, comprising a substantially cylindrical core 49 and a thread 51. The thread 51 can present all kinds of profiles, and can be continuous or discontinuous. The term "thread" corresponds, for example, to a set of threads with different profiles. The shape of the threads may vary along the axis C. The core 49 extends along the axis C. An outer peripheral surface 53 of the core 49 has a radial distance e (FIG. 1) relative to the cooled surface 23. This radial distance e defines the thickness of the layer of solid material disposed against the cooled surface 23. The outer peripheral surface 53 has substantially the same distance e relative to the heated surface 19. The thread 51 is borne by the outer peripheral surface 53. The thread 51 is wound helically around the axis C.

The thread 51 forms a plurality of windings around the axis C. In the example shown, the thread 51 forms first, second, and third groups of windings 55, 57, 59. The first group of windings 55 is located over the portion of the screw 17 engaged in the second axial zone 45. The third group of windings 59 is located on the portion of the screw 17 engaged in the first axial section 18, and in the first axial zone 43. The second group of windings 57 is located at the boundary between the first axial zone 43 and the second axial zone 45. The windings 55 of the first group are separated from each other by a first pitch P1. The windings 57 of the second group are separated from each other by a second pitch P2. The windings 59 of the third group are separated from each other by a third pitch P3. Here pitch is understood to mean the axial distance separating two windings. The pitch P2 is far smaller than the pitch P1 and P3. Thus, at the level of the second group of windings 57 a plug of solid material is created. Indeed, due to the fact that the pitch is reduced, the solid material is more compacted between the second group of windings 57 than between the first group of windings 55 or between the third group of windings 59. Thus, it practically does not allow the gaseous ammonia to pass, such that the gaseous ammonia injected through the injection points 39 practically does not flow from the second axial zone 45 to the first axial zone 43.

In the example shown, the device 9 for collection of the saturated solid material comprises a tank or container 61 arranged at one end of the chamber 13. The container 61 is placed immediately adjacent to the second axial zone 45. The internal volume 15 opens at its axial end 48' inside the container 61. The container 61 has an orifice 63 in the upper part provided for the escape of gaseous ammonia not absorbed by the solid material. This orifice 63 is connected by a pipe to the gaseous ammonia reservoir 37, or to any other system for capture—collection and treatment of waste gases. The solid material saturated with ammonia propelled out of the internal volume 15 by the screw 17 drops to the bottom of the container 61.

The assembly 1 may include a member that provides for taking up the solid material 3 at the bottom of container 61, in a continuous manner, without having to remove the container 61. This member is not shown here.

The assembly 1 may include a member that allows for shaping the ammonia saturated solid, in a continuous manner, for example by a die. This member is not shown here.

The device 7 for feeding the extruder 5 with unsaturated solid material is arranged to deposit the solid material into the internal volume 15 of the chamber 13, in the proximity of the upstream end 48.

The operation of the assembly 1 will now be detailed.

In operation, the screw 17 is driven to rotate about the axis C by the motor 47. The heating device 25 maintains the first heat transfer fluid in circulation through the jacket 27, in a manner to heat the heated surface 19. In parallel, the cooling device 31 maintains the second heat transfer fluid in circulation through the jacket 33, in a manner to cool the cooled surface 23. The ammonia injecting device 11 injects the gaseous ammonia through the injection point 39, into the second axial zone 45. The solid material not saturated with ammonia is introduced into the first axial section 18 of the chamber 13, at the upstream end 48 of the internal volume 15. The thread 51 of the screw 17 advances the solid material axially. The solid material is pressed against the heated surface 19 by the screw 17, the thickness of the layer of solid material corresponding to the radial distance between the outer peripheral surface 53 and the heated surface 19. Due to the heating, the solid material is dried, with any residual water in the solid material being vaporized and discharged. When the solid material reaches the first axial zone 43, it leaves the heated surface 19 and comes into contact with the cooled surface 23. It gradually cools from a temperature of 100-300° C. to a maximum temperature of 40° C. It then reaches the second axial zone 45. In this second axial zone 45, it still continues to remain pressed against the cooled surface 23. The solid material then absorbs the gaseous ammonia injected through the injection points 39. The solid material tends to become heated on account of the heat generated by the absorption reaction but is cooled due to being in contact with the cooled surface 23. The solid material is driven by the screw 17 all the way until the downstream end 48' of the internal volume 15 opening into the container 61, possibly passing through a die. It drops into the container 61 while the gaseous ammonia that is not absorbed by the solid material escapes through the orifice 63.

A second embodiment of the invention will now be described with reference made to FIGS. 2 and 3.

Only the points where the second embodiment differs from the first will be detailed here below. Elements that are identical or performing the same function in both the embodiments are designated by the same reference numerals.

In the example shown in FIGS. 2 and 3, the assembly 1 does not include a device for heating of the solid material.

The assembly 1 also does not include an extruder 5. The latter is replaced by a belt conveyor 65 provided for moving the solid material 3 along a tunnel 67 wherein the injection of gaseous ammonia is carried out.

The belt conveyor 65 comprises a conveyor belt 69 wound around two rollers comprising an upstream roller 71 and a downstream roller 73. The conveyor belt 69 has a conveying strand 75 for conveying the solid material 3 located above the rollers 71 and 73, and a return strand 77 located below the rollers. At least one of the rollers 71 and 73 is motorized and drives the conveying strand 75 along a longitudinal direction indicated by the arrow F in FIG. 2. The cooling device 31 is provided for cooling the conveyor belt 69.

The assembly 1 further includes an aluminum sheet 79 bent into a U shape (FIG. 3). The sheet 79 thus forms a channel open at the top, and provided for receiving the solid material. The sheet 79 rests on the conveying strand 75 supported by a bottom 81. It also comprises two side walls 83, substantially longitudinal and vertical, rising straight up from the bottom 81. The sheet 79 defines on the inside a channel 85, of longitudinal orientation, within which in the solid material 3 is deposited.

The tunnel 67 is placed above the conveying strand 75, and extends longitudinally from an inlet 87 right to an outlet 89. The inlet 87 and the outlet 89 have the same U shape (FIG. 3). They each have a primary zone 91 located close to the conveying strand 75, vertically extended by two vertical slots 93. The primary zone 91 allows the solid material deposited on the bottom 81 of the aluminum sheet 79 to pass through, and the vertical slots 93 allow the two side walls 83 of the sheet 79 to pass through.

As shown in FIG. 2, the ammonia injection device 11 comprises multiple points of injection 39 located on a roof of the tunnel 67. Furthermore, as is visible in FIG. 3, the tunnel 67 is equipped with one or more rakes 95 for the purpose of mixing the solid material. Each rake 95 has a plurality of rigid vertical teeth or rods 97, the free ends of which are immersed vertically in the solid material 3. The rods 97 are rigidly secured to the structure of the tunnel 67.

The assembly 1 also comprises an outfeed conveyor 99 for removing the saturated solid material. This conveyor 99 is not cooled. It is placed longitudinally in line with the conveyor 65, downstream of it if one considers the direction of motion of the solid material 3.

The operation of the assembly 1 will now be detailed.

During operation, the conveyor belt 69 is driven in rotation around the rollers 71 and 73 such that the conveying strand 75 is driven along the longitudinal direction F (from left to right in FIG. 2). A belt 101 of the outfeed conveyor 99 is driven in the same direction. The U shaped aluminum sheet 79 is supported on the conveyor belts 69 and 101 and is driven longitudinally by these conveyor belts. The conveyor belt 69 is maintained by the cooling device 31, at a substantially constant temperature between −33° C. and 40° C., for example between −15° C. and 30° C., and preferably between −10° C. and 10° C. The device 7 for loading the unsaturated solid material deposits on the bottom 81 of the aluminum sheet 79, a layer of unsaturated solid material. It deposits the solid material upstream of the tunnel 67, in an area of the conveying strand 75 located in the proximity of the upstream roller 71. The device 7 is arranged to distribute the solid material on the bottom 81 in a layer having a thickness of less than 20 mm that is substantially constant.

The ammonia injection device 11 injects the ammonia inside the tunnel 67. The solid material is driven by the conveyor belt 69 longitudinally and enters into the tunnel 67 through the inlet 87. Inside the tunnel 67, the gaseous ammonia is in contact with the solid material in a manner such that the solid material will absorb gaseous ammonia. Due to its being placed in contact with the bottom 81 of the aluminum sheet 79, which itself rests on the surface of the cooled conveyor belt 69, the solid material is not excessively heated by the heat generated by the ammonia absorption reaction and remains at a moderate temperature. The solid material, after absorption of ammonia, leaves the tunnel 67 via the outlet 89 and is driven by the outfeed conveyor 99.

The rake 95 disposed within the tunnel 67 enables the stirring of the solid material and facilitates the absorption of ammonia.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A process for ammonia saturation of a solid material capable of absorbing and desorbing ammonia, the solid material being composed of solid particles, the process comprising of the following steps:
   placing of the solid material in contact with a cooled surface, the solid material being disposed against the cooled surface in a thin layer having a thickness of less than 100 mm; and
   injecting a stream of gaseous ammonia to be in contact with the solid material, while the solid material is in contact with the cooled surface, and wherein the solid material moves inside a chamber in which gaseous ammonia is injected, with the solid material moving in a continuous fashion relative to the chamber.

2. The process according to claim 1, wherein the gaseous ammonia is injected at a pressure of between 1 and 3 bar absolute.

3. The process according to claim 1, including drying of the solid material by heating and a step of cooling of the solid material, preceding in this order the injection of a stream of gaseous ammonia to be in contact with the solid material.

4. A process for ammonia saturation of a solid material capable of absorbing and desorbing ammonia, the solid material being composed of solid particles, the process comprising of the following steps:
- placing of the solid material in contact with a cooled surface, the solid material being disposed against the cooled surface in a thin layer having a thickness of less than 100 mm, and wherein the solid material moves along the cooled surface; and
- injecting a stream of gaseous ammonia to be in contact with the solid material, while the solid material is in contact with the cooled surface.

5. A process for ammonia saturation of a solid material capable of absorbing and desorbing ammonia, the solid material being composed of solid particles, the process comprising of the following steps:
- placing of the solid material in contact with a cooled surface, the solid material being disposed against the cooled surface in a thin layer having a thickness of less than 100 mm, and wherein the solid material moves with the cooled surface; and
- injecting a stream of gaseous ammonia to be in contact with the solid material while the solid material is in contact with the cooled surface.

6. A process for ammonia saturation of a solid material capable of absorbing and desorbing ammonia, the solid material being composed of solid particles, the process comprising of the following steps:
- placing of the solid material in contact with a cooled surface, the solid material being disposed against the cooled surface in a thin layer having a thickness of less than 100 mm;
- injecting a stream of gaseous ammonia to be in contact with the solid material, while the solid material is in contact with the cooled surface, and
- drying of the solid material by heating and a step of cooling of the solid material, preceding in this order the injection of the stream of gaseous ammonia to be in contact with the solid material, wherein the solid material is moved in a continuous fashion from the step of heating to the step of cooling, and then to the step of injection of a stream of gaseous ammonia to be in contact with the solid material.

* * * * *